(12) United States Patent
Buijs et al.

(10) Patent No.: US 11,425,888 B2
(45) Date of Patent: Aug. 30, 2022

(54) ANIMAL FARM SYSTEM AND METHOD OF GENERATING BARN MAP INFORMATION OF SAID ANIMAL FARM SYSTEM

(71) Applicant: LELY PATENT N.V., Maassluis (NL)

(72) Inventors: Martinus Cornelis Johannes Buijs, Maassluis (NL); Mauro Brenna, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 411 days.

(21) Appl. No.: 16/342,430

(22) PCT Filed: Oct. 13, 2017

(86) PCT No.: PCT/NL2017/050673
§ 371 (c)(1),
(2) Date: Apr. 16, 2019

(87) PCT Pub. No.: WO2018/074917
PCT Pub. Date: Apr. 26, 2018

(65) Prior Publication Data
US 2019/0246600 A1   Aug. 15, 2019

(30) Foreign Application Priority Data
Oct. 20, 2016 (NL) ..................................... 2017645

(51) Int. Cl.
| | | |
|---|---|---|
| *A01K 5/02* | (2006.01) | |
| *A01K 1/01* | (2006.01) | |
| *A01K 5/00* | (2006.01) | |
| *G05D 1/00* | (2006.01) | |
| *G05D 1/02* | (2020.01) | |
| *A01K 1/12* | (2006.01) | |
| *A01K 1/10* | (2006.01) | |

(52) U.S. Cl.
CPC .......... *A01K 5/0266* (2013.01); *A01K 1/0128* (2013.01); *A01K 5/00* (2013.01);
(Continued)

(58) Field of Classification Search
CPC .... A01K 5/0266; A01K 1/0128; G05D 1/021; G05D 1/0044; G05D 1/0033; G05D 2201/0201; G05D 1/0274
See application file for complete search history.

(56) References Cited

U.S. PATENT DOCUMENTS 5,995,884 A    11/1999  Allen et al.
9,323,250 B2 *  4/2016  Wang ..................... B25J 11/009
(Continued)

FOREIGN PATENT DOCUMENTS

JP           4852753 B2 *  1/2012  ............... G05D 1/02
WO   WO-2011055711 A *  5/2011  ............. G01S 17/89
(Continued)

OTHER PUBLICATIONS

Joseph Lee, Yan Lu, Yiliang Xu, and Dezhen Song, "Visual Programming for Mobile Robot Navigation Using High-level Landmarks", 2016 IEEE/RSJ International Conference on Intelligent Robots and Systems (IROS), Daejeon Convention Center, Oct. 9-14, 2016, Daejeon, Korea, pp. 2901-2906 (Year: 2016).*
(Continued)

*Primary Examiner* — Peter D Nolan
*Assistant Examiner* — Tanya C Sienko
(74) *Attorney, Agent, or Firm* — Birch, Stewart, Kolasch & Birch, LLP

(57) ABSTRACT

An animal farm system includes a barn, animal related structures within the barn, such as a feeding alley and/or a milking system, and an autonomous vehicle arranged to perform an animal related action and move about in the barn. The vehicle includes a control unit to move the vehicle about, a position determining system for determining a position of the vehicle in the barn, a sensor system to determine a value of a parameter related to a position of the vehicle with respect to the barn or an object therein, such as
(Continued)

Figure 1:
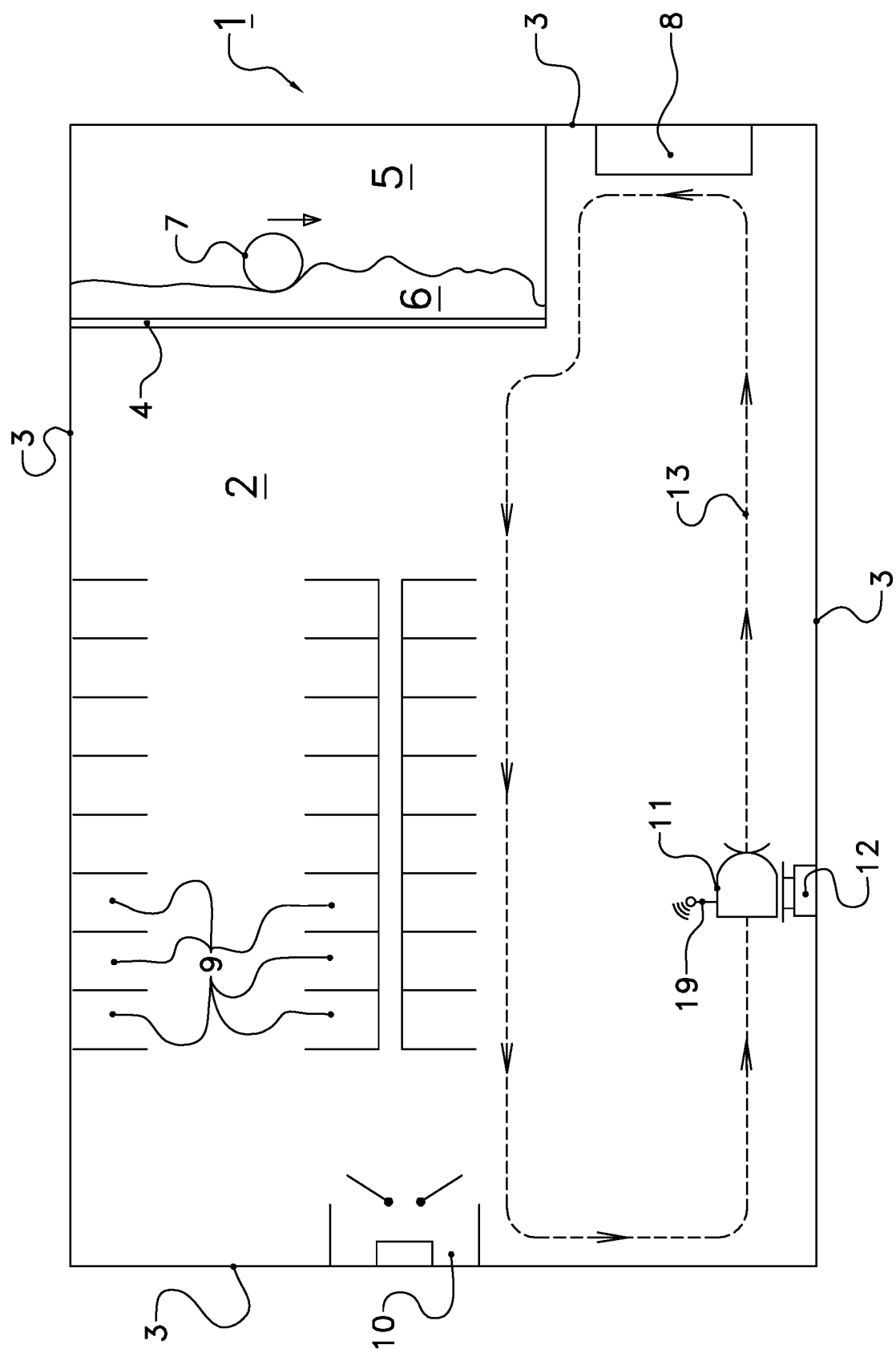

the at least one structure therein, and a vehicle communication device. The control unit further is arranged to contain barn map information, and receive motion control and navigation information via the vehicle communication device.

21 Claims, 3 Drawing Sheets

(52) U.S. Cl.
CPC ......... *G05D 1/0033* (2013.01); *G05D 1/0044* (2013.01); *G05D 1/021* (2013.01); *A01K 1/105* (2013.01); *A01K 1/123* (2013.01); *G05D 1/0274* (2013.01); *G05D 2201/0201* (2013.01)

(56) References Cited

U.S. PATENT DOCUMENTS

2005/0085947 A1* 4/2005 Aldred ................. G05D 1/0274
　　　　　　　　　　　　　　　　　　　　　　700/253

2014/0316636 A1  10/2014  Hong et al.
2015/0230427 A1*  8/2015  Wisse .................... A01K 29/00

FOREIGN PATENT DOCUMENTS

| WO | WO 2011/142657 A1 | 11/2011 |
| WO | WO 2015/170967 A1 | 11/2015 |
| WO | WO 2016/023716 A1 | 2/2016 |
| WO | WO 2016/103067 A1 | 6/2016 |

OTHER PUBLICATIONS

Lely Dairy Equipment—Milk, feeding, and barn solutions. Pamphlet. Downloaded from https://www.lely.com/media/lely-centers-files/brochures/published/lely_dairy_equipment_2014_-_en.pdf (Year: 2014).*

International Search Report, issued in PCT/NL2017/050673, dated Aug. 24, 2018.

Written Opinion of the International Searching Authority, issued in PCT/NL2017/050673, dated Aug. 24, 2018.

* cited by examiner

ANIMAL FARM SYSTEM AND METHOD OF GENERATING BARN MAP INFORMATION OF SAID ANIMAL FARM SYSTEM

The present invention relates to an animal farm system, comprising a barn for holding animals, in which barn the animals are allowed to move about freely, and that has walls, at least one animal related structure positioned within the barn, such as a feeding alley or feeding system, a drinking system, a cubicle, and/or a milking system, an autonomous vehicle arranged to perform an animal related action and to move about in the barn, wherein the vehicle comprises a control unit to control the autonomous vehicle at least to move the vehicle about in the barn, a position determining system operably connected to the control unit, for determining a position of the vehicle in the barn with respect to a reference position, a sensor system operably connected to the control unit, and arranged to repeatedly determine a value of a parameter related to a position of the vehicle with respect to the barn or an object therein, such as the at least one structure therein, and a vehicle communication device operably connected to the control unit, wherein preferably the control unit further has a memory arranged to contain barn map information, i.e. the memory is configured so that barn map information can be entered into the memory, and wherein the control unit is arranged to receive motion control information and/or navigation information via the vehicle communication device.

Such animal farm systems are known in the art, as autonomous vehicles that perform one or more tasks in the barn. Examples are the Lely Discovery® manure scraping robot, and the Lely Juno® feed pusher.

For such animal farm systems, motion control information and/or navigation information is required for the vehicle to be able to move around according to a programmed route and perform its task. For example, the motion control information and/or navigation information comprises a number of vehicle control actions, such as driving a predetermined distance along a wall while the vehicle abuts against said wall, driving a predetermined distance along a straight line, making a turn having a predetermined curvature, and/or driving a predetermined distance along a wall while the vehicle remains at a predetermined distance from said wall. However, the vehicle does not contain barn map information, i.e. the vehicle only contains a number of vehicle control actions without "knowing" where it is located within the barn. If the vehicle gets lost along its programmed route, the vehicle is programmed to perform a number of actions so as to find its way back. However, the possibilities are limited as the position of the vehicle within the barn is unknown. Thus, it would be advantageous for the vehicle to use barn map information. However, it is a laborious task for the farmer to enter such information in the animal farm system, in particular when the level of accuracy required for the vehicle's operation is taken into account.

It is an object of the present invention to provide an improved animal farm system, in particular to provide an animal farm system of the type described above, wherein sufficiently accurate barn map information is made available both simpler and more efficient.

The invention achieves the object at least in part by means of an animal farm system, in particular an animal farm system, comprising a barn for holding animals, in which barn the animals are allowed to move about freely, and that has walls, at least one animal related structure positioned within the barn, such as a feeding alley or feeding system, a drinking system, a cubicle, and/or a milking system, an autonomous vehicle arranged to perform an animal related action and to move about in the barn, wherein the vehicle comprises a control unit to control the autonomous vehicle at least to move the vehicle about in the barn, a position determining system operably connected to the control unit, for determining a position of the vehicle in the barn with respect to a reference position, for example the position of a charging device for charging a battery system of the vehicle, a sensor system operably connected to the control unit, and arranged to repeatedly determine a value of a parameter related to a position of the vehicle with respect to the barn or an object therein, such as the at least one structure therein, and a vehicle communication device operably connected to the control unit, wherein preferably the control unit further has a memory arranged to contain barn map information, i.e. the memory is configured so that barn map information can be entered into the memory, and wherein the control unit is arranged to receive motion control information and navigation information via the vehicle communication device, wherein the animal farm system further comprises an external communication device arranged to exchange information with the vehicle communication device, wherein the control unit is arranged to send the at least one determined position of the vehicle, and the at least one determined parameter value via the vehicle communication device to the external communication device, wherein the external communication device is arranged to visualize the received at least one determined position of the vehicle, and to visualize the received at least one determined parameter value in dependence of the momentary determined position of the vehicle, wherein the external communication device is further arranged for inputting, such as by drawing, by a user, of barn map information on the basis of the visualized position and/or parameter values, and is further arranged to send the inputted barn map information to the control unit.

The invention is based on the insight to use the position determining system and the sensor system of the vehicle to base the map on, but to let a user assess the vehicle's position and measured data in relation to the real-world environment and actually "draw" the map step by step, by generating barn map information and/or adding barn map information to the map while the vehicle is moving around the barn. In this way, sufficiently accurate barn map information is made available in a simple and efficient manner. Moreover, the disadvantages of e.g. SLAM (simultaneous localisation and mapping) are prevented. Although SLAM is a probabilistic approach that inherently deals with uncertainty, it is not an optimum solution for the present case of an animal barn, which is a dirty environment with moving objects (such as cows), and may have unexpected obstacles, put there e.g. by the farmer. Therefore, it is advisable that a user is present to assess which sensor signals relate to true objects, and which do not.

In the present invention, the vehicle gives its position as well as measured data that will be indicative of detected obstacles. Assuming that no animals are present while the vehicle is driving, the detected obstacle(s) will very likely be a wall of the barn or an animal related structure. Since the user is present, he can immediately assess the situation, and couple the information to one or more of the walls or animal related structure(s), or not if there happens to be an incorrect measurement.

Furthermore, just because the user can input barn map information directly, the vehicle, and the system in general, can use the information immediately thereafter. And note that this is also a simple way to combine the planning of routes, such as by sending motion control information, and drawing a map, since that map can be drawn during steering the vehicle along a route to be followed.

In the above, the vehicle can of course move about in the barn except for the animal related structure(s). Furthermore, the position of the vehicle as determined by the vehicle may be a relative position, such as determined by means of odometry, or an absolute position, such as determined by means of a local or absolute gps system and so on. In each case, it goes without saying that the position determining system comprises corresponding suitable parts.

Herein, and in all of the description, "arranged to" can mean "programmed to" in case of control systems and the like. This will be clear from the context. Furthermore, when a system or part is "arranged to visualize", this means that the system or part is provided with a display device or display screen of any suitable kind, and is arranged/programmed to show the desired information on the display device or display screen.

Suitable and advantageous embodiments are described in the dependent claims, as well as in the description below.

In embodiments, the barn map information, in particular the user inputted barn map information, comprises at least one of a position, dimension, orientation or designation ("name", such as feed fence, parlour, etc.) of one of said animal related structures. Herein, since the user is present to assess the determined information from the vehicle, he can immediately see whether or not detected information relates to an actual obstacle such as an animal related structure, and act accordingly. If it does, he can input barn map information based on the information determined by the vehicle. For example, if the user sees that the structure relates to a wall, he can enter the wall by indicating the beginning and the end of the wall based on sudden jumps in the vehicle determined information. He can also draw a straight line from the beginning to the end, neglecting any wobbles and the like in the vehicle determined information in between. Additionally, he can designate the structure as "wall" or any other useful name.

In embodiments, the control unit is arranged to use inputted barn map information, in particular for controlling to move the vehicle or to calibrate or verify a position as determined by the position determining system, more in particular before the barn map information is complete. As soon as the user has inputted barn map information, this information becomes available for the vehicle control. It can then be used as e.g. additional reference positions to navigate through the barn, for example by wall following. This dynamic approach is a useful advantage of the invention.

In embodiments, the motion control information and/or navigation information comprises instructions for moving the vehicle in a desired direction, in particular along a desired route. Having such motion control information and/or navigation information, that may have been prepared in advance in the form of a set of general instructions, can give the advantage of combining the setting of one or more actual routes on the one hand, that have to be entered anyway for the vehicle to perform its later function, with the mapping and thus the actual measuring of structures and walls within the barn on the other hand.

In embodiments, the control unit is arranged to control the vehicle based on the motion control information and/or navigation information, wherein the motion control information and/or navigation information comprises a number of vehicle control actions based on the user inputted barn map information, for example driving along a wall defined based on the user inputted barn map information while the vehicle abuts against said wall, and/or driving along a straight line from a start point to an end point defined on a barn map created based on the user inputted barn map information, and/or making a turn defined on a barn map created based on the user inputted barn map information, and/or driving along a wall defined based on the user inputted barn map information while the vehicle remains at a predetermined distance from said wall, and/or driving to the reference position, such as a charging device for charging the vehicle, defined on a barn map created based on the user inputted barn map information. Thus, the vehicle's position on the barn map is known and the vehicle control actions are defined with respect to the position of the vehicle on the barn map. As the vehicle's position is known, it will be easier to bring the vehicle back to its desired route if it loses its way.

In embodiments, the parameter related to a position of the vehicle with respect to the barn or an object therein is or comprises a distance, in particular a horizontal distance, to an object, for example an obstacle, such as one or more of said animal related structures and/or one or more of said walls. In embodiments, the sensor system comprises a distance sensor, in particular an ultrasonic sensor, a laser distance sensor and/or a 3D-camera system. The sensor system with the distance sensor can be used to navigate or determine position by repeatedly measuring a distance to an object, while the vehicle is moving. This way, the position, dimensions and orientation of any obstacle can be determined easily. The type of distance sensor can be selected based on the requirements. For example, an ultrasonic sensor is less sensitive to dirt, which is an important advantage in a barn environment, while a 3D camera system can be very precise, and has the advantage of being able to determine distances for a large number of directions in one go.

In embodiments, the sensor system comprises at least two distance sensors, wherein, in the case that one of the sensors measures a second distance that the control unit maps on a structure in the map, the control unit is arranged to control the vehicle and/or to correct the position as determined by the position determining system on the basis of the second distance. This allows the system to calibrate the vehicle's position based on a known position of a wall or other structure. A first distance sensor determines the distance to the known structure, while a second distance sensor determines the distance to another wall or other structure. Based on the first distance, the vehicle's position can be corrected with respect to the known wall or structure (and the control unit is then accordingly arranged). This allows to determine the position et cetera of the other wall or structure more precisely.

In embodiments, the vehicle comprises wheels and a drive motor for driving at least one of the wheels, wherein the position determining system comprises a system for measuring travelled distance based on wheel revolutions and/or a system for measuring the amount of energy delivered to the drive motor and/or a gyroscope for determining a direction of travel. Also, the position determining system may be provided with the sensor system, i.e. the value of a parameter related to a position of the vehicle with respect to the barn or an object therein as determined by the sensor system, for example a distance, in particular a horizontal distance, to an object, in particular measured by an ultrasonic sensor, can be used by the position determining system for determining the position of the vehicle in the barn with respect to the reference position. A position determining system of this type includes simple, reliable and inexpensive sensors and can be used in a barn environment in a more reliable manner than, for example, a gps system or a camera image recognition system.

According to the invention, the map of the barn can be created and/or programmed in a (semi-)automated manner based on data from the position determining system and data from the sensor system, in combination with input from an operator observing the real-world environment of the barn. For example, the operator creates the barn map using the external communications device, in particular a handheld device, such as a smartphone, tablet, laptop or the like held by the operator. The movement of the vehicle can be controlled by manual input from the operator, in particular using the same external communications device. The operator controls the movement of the vehicle along a desired route or path to be programmed. While travelling along the desired route or path, the vehicle collects the data detected by the position determining system and the data detected by the sensor system. Said data is displayed on a display device of the external communications device, which can be interpreted by the operator. The operator will be able to recognize any obstacles, such as walls or animal related structures, both in the barn and on the display device. Thus, in real-time, the operator can see both the real-world environment of the barn and the "virtual" map with the detected data on the display device. Based on this, the operator creates the barn map step-by-step along the desired route or path. After the barn map has been completed, or immediately when a part of the barn map has been entered into the control unit, for example a wall, said barn map information is available for the position determining system. Based on the barn map information, the operator can program the desired route or path of the vehicle by inputting a number of vehicle control actions into the external communications device, which are then sent to the control unit of the vehicle. The vehicle control actions are defined with respect to a reference position on the barn map, i.e. the vehicle position is known on the barn map while the vehicle travels along the programmed route or path. Then, the vehicle has been programmed so as to operate in a fully automated manner. Moreover, if the vehicle gets lost along the way, it will be relatively easy for the vehicle to find its way back using the barn map information.

In embodiments, the external communication device comprises a computer with a display, in particular a smartphone or tablet computer, and wherein the computer is arranged to visualize on the display said positions as a set of vehicle position indications with respect to a reference position and as determined by the position determining system, and said parameter values as a set of object position indications on the basis of the parameter value determined by the sensor system and in each case with respect to a momentary vehicle position at which the parameter value was determined. This is an elegant way of providing the user with the required information, i.e. vehicle position and indicated object position, on a screen of a computer such as in particular a handheld computer, i.e. a laptop, tablet, smartphone or the like, such that it is easy to be close to the moving vehicle. The portable computers are well-equipped to send the instructions to the control system, both for controlling the route and for providing barn map information. Of course, the object positions can be provided by combining the measured distance or other parameter with the determined vehicle position. The object position calculated therefrom can be indicated on the map as collected thus far, such as by a dot, a cross, a circle or the like. After having moved over a certain distance, during a certain time and so on, the vehicle performs another measurement, and thus may determine a new object position, which is also indicated on the map. Slowly, a number of detected object positions will be indicated, and the user can literally connect the dots.

In embodiments, the external communication device is arranged to receive a user input that couples or links one or more of said object position indications to one or more of said animal related structures and/or one or more of said walls. As indicated already above, such coupling or linking turns a number of object position indications into a wall or animal related structure, such that also intermediate positions can be taken into account. The user input may be an instruction to couple a range of object positions to a wall or one of a number of preselected types of animal related structures, such as a feed fence, a milking box, a cubicle, a door and so on. The computer of the external communication device may furthermore be programmed to represent the object of the selected type graphically as a corresponding object on the display screen, for easier reference.

In embodiments, the external communication device is arranged to receive from a user correction information for one or more of said object position indications and send said information to the vehicle communication device, and wherein the control unit is arranged to store said information in the memory as corrected navigation information. This feature allows for correction by a user of an incorrectly determined vehicle position and/or determined object position, for example due to wheel slip. Since a user is often present during the moving of the vehicle and the corresponding determination of object positions, the user can notice such errors or disturbances, and correct same where desired. It is also possible that this error goes unnoticed, but is at any point in time determined to be present. For example, it could be that the vehicle determines the presence of a wall or other structure over a certain distance such as 11 meters. This is concluded because over a distance of 11 meters as determined by the vehicle itself, the vehicle detects a structure with its distance sensor. However, if from a later or earlier measurement the user knows that the structure is 12 meters long, he can correct the length of the structure in the barn map information. This is just a simple example, and any other dimensions may also be correctable. Herein, having reference information about the structure(s), such as positions or lengths, is very advantageous. Reference is also made to the embodiments in which there are two or more (distance) sensors, which helps in creating additional reference information while the vehicle is moving.

In embodiments, the barn comprises an electrical charging device for charging electrical energy in the vehicle, in particular wherein the reference position is a position of the charging device. Such a charging device is often present for an autonomous vehicle, and is a natural starting point with a known position, especially since many, if not all, routes to be travelled by the vehicle will often start at the charging position. Of course, any other position may also be a starting point.

In embodiments, the position determining system comprises an odometry system. Such a system determines a position by monitoring the path traveled by the vehicle, for example by counting the revolutions of the wheels. This is a simple and autonomous system. Other position determining systems are not excluded, such as a global or local gps, that work on satellite or beacon signals.

In embodiments, the autonomous vehicle is a feed pusher, a feeding vehicle, a manure removal device or a milking vehicle, wherein the animal related action is one or more of delivering animal feed to animals in a barn, pushing material over a floor of a barn, in particular animal feed lying on the floor of a feed alley towards a feed fence, pushing manure over a slatted floor of a barn, taking up, for example by sucking and/or scooping, manure from a floor of a barn, or milking an animal. These are advantageous examples of autonomous vehicles that perform an animal related action in a barn, and often need to follow a route to perform that action. However, other vehicles are not excluded, such as a feeding vehicle that feeds animals such as calves. Note that some vehicles travel only in part of a barn, such as a feed pusher, that often travels in a part of the barn where no animals walk about, viz. the opposite side of a feed fence. Nevertheless, these vehicles, too, move through a barn along a desired route and may thus gain from the present invention.

The invention also relates to a method that enables to provide the map information regarding the barn for an animal farm system according to the invention in a simpler and more efficient way, in particular to a method according to claim 12, in particular a method of generating barn map information of an animal farm system according to any preceding claim, the method comprising generating an empty map on the external communication device, designating a reference position, in particular a starting position for the vehicle, controlling the vehicle to move in the barn, while the vehicle moves, having the vehicle positioning system repeatedly determine a position of the vehicle and having the sensor system determine a parameter value at said position, sending the determined positions and parameter value to the external communication device, visualizing the parameter values, in particular as obstacle positions, in dependence of the determined positions, inputting into the external communication device, by a user, barn map information based on the visualized parameter values, in particular on the obstacle positions, receiving by the control unit, and preferably storing in a memory of the control unit, of said inputted barn map information.

The inventive thought behind this method is based on the same considerations as for the system described above, and thus need not be repeated here. Again, it is pointed out that the invention allows to start with an empty map, and to build the map while the vehicle is driving or being driven along a route or otherwise, wherein the user builds on measurements from the vehicle. It is furthermore pointed out that in principle all features of the system embodiments apply in a similar fashion to the method according to the invention, but that not all these features are repeated here.

In embodiments, the step of determining the position of the vehicle comprises, in case the memory comprises already some barn map information with position information of at least one animal related structure, matching one or more of the parameter values on the basis of the stored barn map information and the determined position of the vehicle. In this way, the vehicle's position may be determined more accurately. The parameter values, in particular values of the distance between the vehicle and an object as determined by a distance sensor on the vehicle, may be linked to a position of an animal related structure or wall. If that position is already known from earlier parts of the method or from reference information, the vehicle position may be corrected with this information. This may be performed by the user.

In embodiments, the sensor system comprises a first sensor and a second sensor, each arranged to determine a parameter value, further comprising determining with the first sensor a first parameter value corresponding to a stored map information, in particular a stored obstacle position, and correcting the determined vehicle position on the basis of the determined first parameter value, and determining a second parameter value with the second sensor, and determining a new obstacle position based on the corrected vehicle position and the second parameter value. With such embodiments, a user can use already determined map information in determining new map information, as already described for the corresponding system embodiments: a first parameter value, such as a distance, is used to correct the vehicle position, and a second parameter value can then be used with similarly increased accuracy to determine a position of another structure or wall.

Figure 2B:
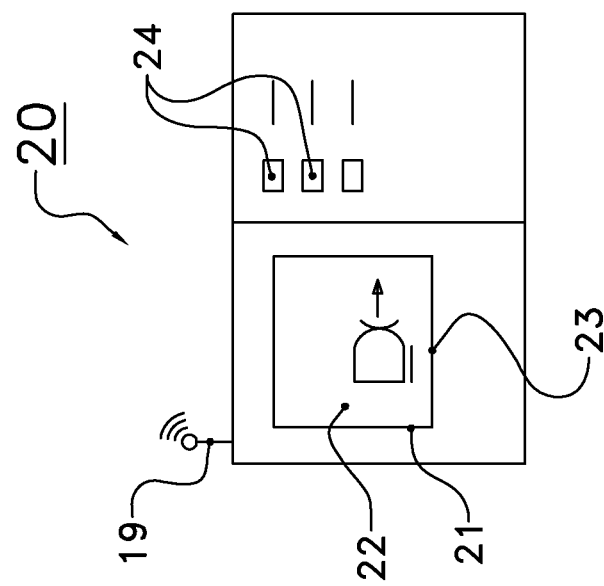
Figure 2A:
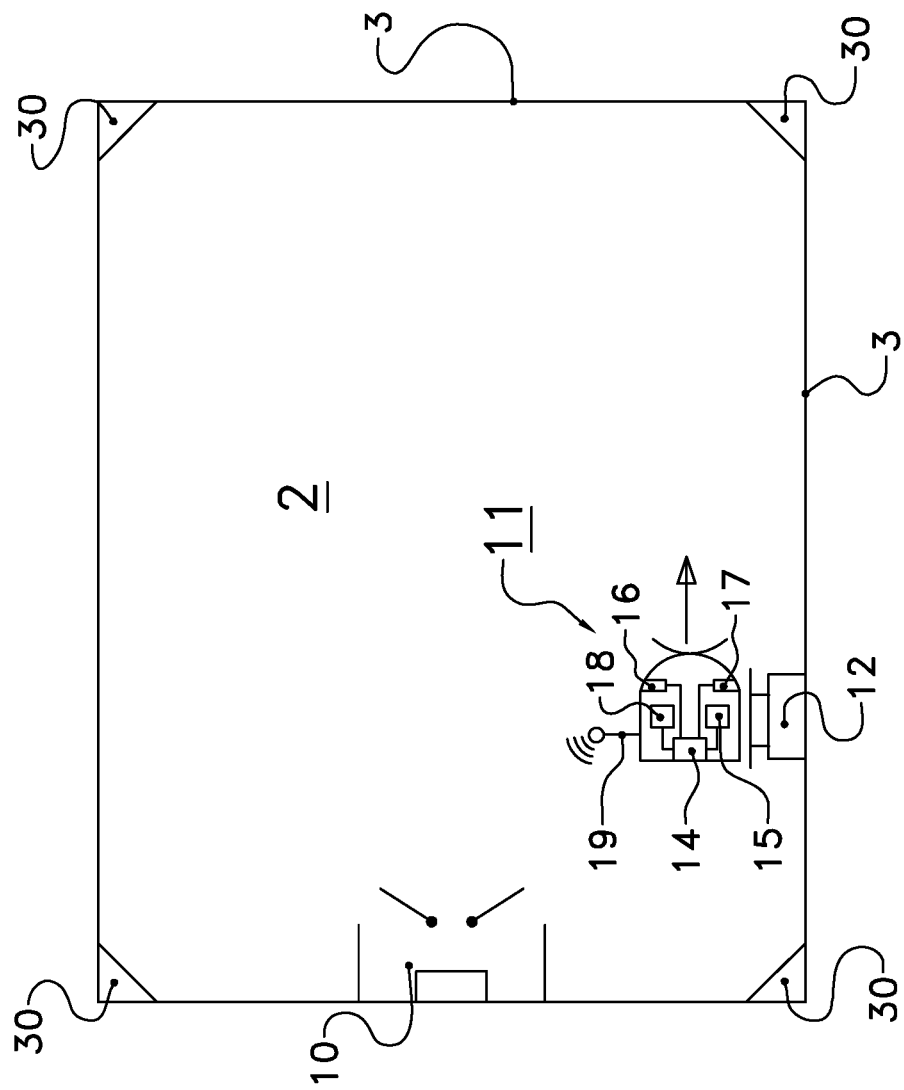
Figure 3:
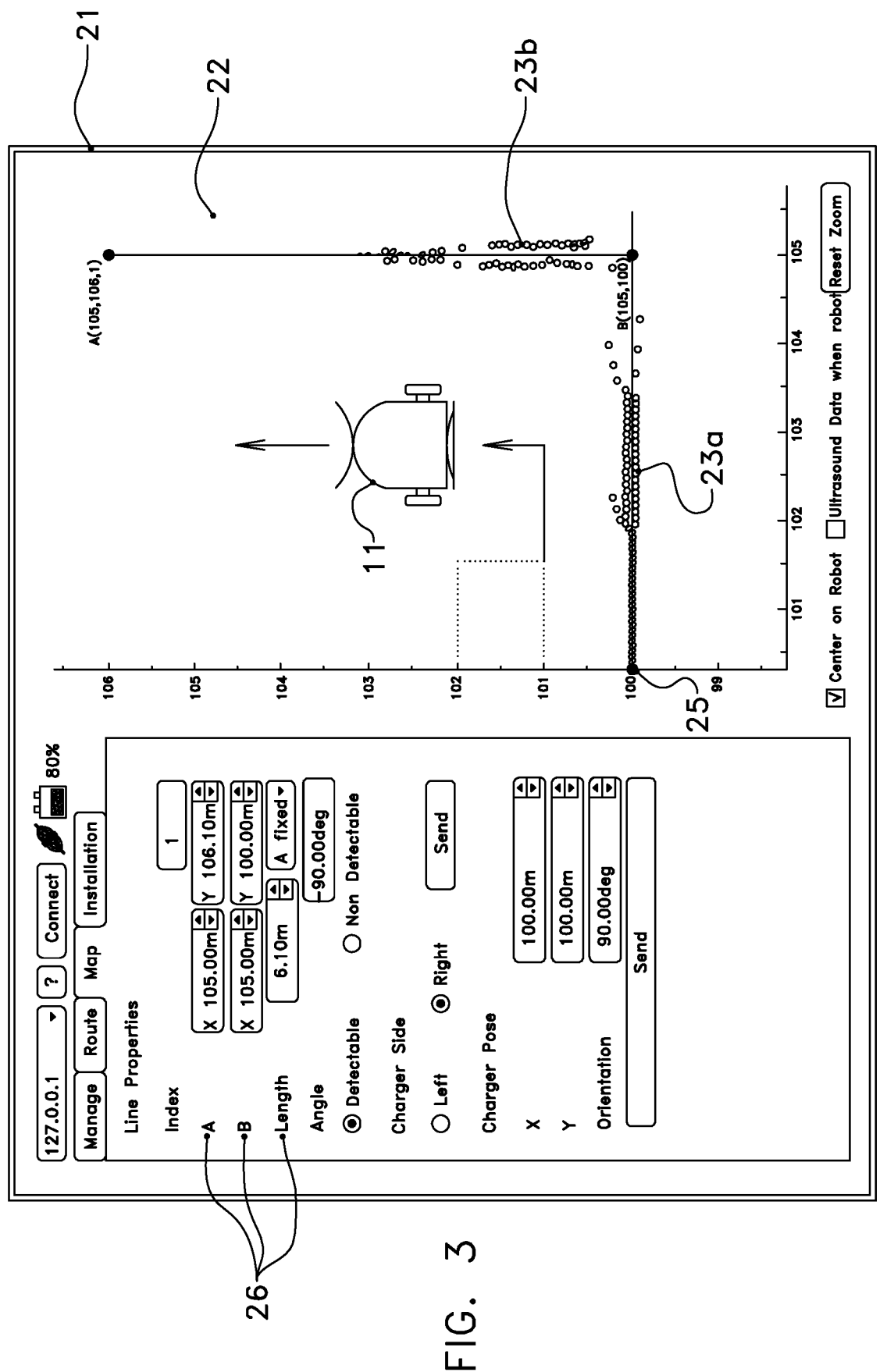

The invention will now be explained further by means of the drawings, that show embodiments of the invention, and in which:

FIG. 1 diagrammatically shows a part of an animal farm system according to the invention;

FIGS. 2a and 2b diagrammatically show an animal farm system according to the invention; and FIG. 3 diagrammatically shows a detail of the animal farm system during mapping a barn.

FIG. 1 diagrammatically shows a part of an animal farm system according to the invention, that is generally designated with reference numeral 1. It comprises a barn 2 in which animals such as cows (not shown here) can move about freely. The barn has walls 3 and animal related structures like a feed fence 4, a drinking trough 8, cubicles 9 and a milking system 10.

Behind the feed fence 4 is a feed alley 5 with feed 6, pushed by a feed pusher 7. Another vehicle is a manure scraper 11, here at a charging device 12 and about to follow a route indicated by the line 13.

The animal farm system 1 shown here is designed for milking animals such as cows, but may also be designed for other animals, such as meat cattle. In such a case, fewer, more or other animal related structures may be provided as desired. In the present case, there is feed fence 4 that separates a barn part that is accessible for animals from the feed alley 5 that is not. In the feed alley 5, a farmer or automated system may provide feed 6 such as roughage. Here, an autonomous feed pusher vehicle such as the Lely Juno® is provided, that pushes tossed about feed toward the feed fence 4, so that the animal can reach it again. The feed pusher 7 thereto moves along the arrow shown, along a route parallel to the feed fence 4. Even though the feed alley 5 cannot be reached by animals, it is still part of the barn 2, and the present invention applies.

Another autonomous vehicle provided here is a manure scraper 11, such as the Lely Discovery®. It is shown here at a charging device 12, for recharging its battery. Such position is a useful reference point for orientation and navigation, and can be used in the routes to be followed by the vehicle, such as the diagrammatic route indicated with the line marked 13. This route is very simple, and given only for illustrational purposes.

For the vehicle 11 to be able to follow that route 13, it has map information about the animal farm system 1, and the barn 2 and its animal related structures in particular. The farmer could then draw a map by hand, based on his knowledge of the barn 2 such as technical drawings, and later on program routes for the vehicle. This is not only tedious work, but also error prone, because the animal related structures might in reality be different from the planned dimensions and positions as in the technical drawing. Furthermore, the map drawing and route programming are two different and subsequent tasks. With the present invention, the two tasks can be combined and to a certain degree automated. This will be further explained in FIGS. 2a, b and 3.

FIGS. 2a and 2b diagrammatically show an animal farm system according to the invention, and FIG. 3 diagrammatically shows a detail of the animal farm system during mapping a barn. Herein, the same reference numerals indicate the same or similar parts. FIG. 2a shows the barn 2 and FIG. 2b shows an external communication device 20. Optional positioning beacons are indicated by reference numeral 30.

The manure scraper 11 comprises a control unit 14 with a memory (not shown), a position determining system 15, a first distance sensor 16, a second distance sensor 17, a vehicle communication device 18 and an antenna 19. The external communication device is shown as a computer 20, such as a laptop computer or tablet computer, and with a display screen 21 showing a map 22, that indicates a first distance measurement 23, as well as buttons 24.

The tablet 20 in FIG. 3 shows the map 22 with the vehicle 11, a number of position dependent distance measurement indications 23a, b and the origin 25. Specific map information input buttons are designated 26.

The vehicle 11 can move manure across the floor with a scraping device. Thereto, it moves along a route under the control of a control device 14. The control device 14 is operably connected to the position determining device 15. The latter comprises an odometry system, that determines the vehicle's position by monitoring wheel revolutions, and thus also orientation, of the wheels of the vehicle 11, according to principle known per se. Alternatively or additionally, there may be provided an IMU unit, a gyroscope, an accelerometer, a gps system that uses satellite signals, and/or a local positioning system that uses signals from the optional positioning beacons 30.

Furthermore, the vehicle has a first distance sensor 16 and optionally a second distance sensor 17, such as in each case an ultrasonic sensor that is less sensitive to manure and other dirt in a barn. However, other sensors such as gyroscopes, cameras and so on are possible too. The control unit can relay the measured distance, as well as the determined vehicle positions, to the external communication device 20, via e.g. vehicle communication system 18 and the antennae 19, that are only being shown diagrammatically, and may be part of a wireless communication system.

To start programming a route, which will lead the vehicle 11 through the barn 2, and along a number of the walls 3 and animal related structures, of which here only the milking system 10 is shown, a user with an external communication device 20, here a tablet computer, first establishes contact with the control unit 14 of the vehicle 11, such as via antennae 19 and wifi or the like. The tablet 20 will show an empty map, without any features.

The vehicle 11 will be deemed present at an origin of the map, for which there is often taken the position at the charging device 12. The orientation of the vehicle 11, as determined by the user, is also indicated in the map, by correspondingly indicating a graphical representation of the vehicle in the map. If desired, a first distance measurement may already be performed by the first and/or second distance sensor 16, 17. Based on the measured distance and the starting position of the vehicle 11, this corresponds to an object position and this is indicated on the map as a small circle 23. Note that in this case that circle 23 could indicate either the charging device 12 or the wall 3 behind it.

Next, the user gives an instruction to start moving forward, i.e. in the direction of the arrow. The instructions can be input by means of the buttons 24, that may be physical buttons or graphical buttons on the display screen 21. While moving, the control unit receives vehicle positions from the position determining system, and measured distances from the distance sensor(s) 16 (and/or 17), and sends these to the external communication device 20 via its own vehicle communication device 18 and antennae 19. The external communication device 20 (or the control unit 14 for that matter) calculates object positions from the combined data, and displays these detected object positions as circles 23a or like representations on the display screen 21. One notes that the first group of circles in group 23a are on a strictly straight line, and these can directly be designated as a wall, by the user. A bit further down the route, just before the middle of the group 23a, there are two detected object positions for each vehicle position, as can be seen from the two parallel subgroups of circles. This is e.g. due to echoes in the ultrasonic device, that may be caused by dirt on the walls and so on. For the moment, the user can correct this by drawing a straight line, since he knows that the group 23a represents a straight wall. The line starts in the origin 25 where the vehicle started, and through the group 23a according to a best fit, but without yet knowing precisely where the wall ends.

Further down the route, the user, who will often be present right beside or even inside the barn, will notice that the vehicle 11 nears a wall, and will order the vehicle to turn in the desired direction, here to the left. The vehicle 11 will continue determining its own position and, via the distance measurements, those of objects, and send same to the tablet 20. These positions are represented by group 23b of circles. Again, there is a double, parallel group of circles, and an upper subgroup of circles on a more or less straight line which is in the middle of the two parallel groups. The user can then simply draw the conclusion that group 23b also represents a wall. Then he can draw a straight line through group 23b, and truncate the line where it crosses the line through group 23a, the latter being truncated where it crosses the former line. The user then ends up with a (yet partial) map with the correct positions of the two walls, as well as with instructions for moving along the walls.

Herein, it is noted that the user need not be present to view the vehicle and barn. Alternatively, the vehicle could indicate bumping into an object, after which the user could indicate to turn left, with knowledge of the barn layout. The bumping point, or a point nearby, could then still be a waypoint for the route.

By stepwise inputting the route, and detecting objects, route and map may be constructed.

It is also noted that this stepwise approach allows to use information while the map is being constructed. With reference to the route 13 shown in FIG. 1, there are possibilities to use map information that was created earlier to guide the vehicle 11, or to correct map information. For example, when the vehicle 11 nears the endpoint, at the charging device 12, the odometrically determined vehicle position may be compared to the origin at the charging device, that should ideally be the same. If it is not, a corresponding correction may be applied on earlier determined positions, or it may be concluded to once again follow the route, and check the positions. In addition, with reference to the U-turn in the right bottom corner of the barn 2, use could be made of the second distance sensor of the vehicle. This will be explained with reference to the vehicle as shown in FIG. 2a. For the most part, use will have been made of the distance sensor 17, that gives a reading of the object nearest by, viz. the wall. However, there may optionally have been provided another distance sensor opposite, in this case sensor 16. Sometimes, another object opposite lower wall 3 is sufficiently close for the sensor 16 to detect, such as the inner wall from the feed fence 4 to the right wall 3, in case the vehicle 11 is in the lower right corner. In such case, the positions of said inner wall as detected by the sensor 16 may already be processed in the map information, and may then be used to guide the vehicle 11 even before the vehicle moved past that object. So the second sensor's readings may be used to guide the vehicle, but also to check or calibrate the readings of the other distance sensor, in this case sensor 17, when the vehicle has completed the U-turn and moves past the inner wall. After all, that inner wall is then detected by a different sensor (17 instead of 16) but should result in the same position.

The invention claimed is:

1. An animal farm system, comprising:
    a barn for holding animals, the barn having walls, wherein the animals are allowed to move about freely within the barn;
    at least one animal related structure positioned within the barn; and
    an autonomous vehicle arranged to perform an animal related action and to move about in the barn,
    wherein the vehicle comprises:
        a control unit to control the autonomous vehicle at least to move the vehicle about in the barn;
        a position determining system operably connected to the control unit, for determining a position of the vehicle in the barn with respect to a reference position;
        a sensor system operably connected to the control unit, and arranged to repeatedly determine a value of a parameter related to a position of the vehicle with respect to the barn or an object therein; and
        a vehicle communication device operably connected to the control unit,
    wherein the control unit is arranged to receive motion control information and/or navigation information via the vehicle communication device,
    wherein the animal farm system further comprises an external communication device arranged to exchange information with the vehicle communication device,
    wherein the control unit is arranged to send the at least one determined position of the vehicle, and the at least one determined parameter value via the vehicle communication device to the external communication device,
    wherein the external communication device is arranged to visualize the received at least one determined position of the vehicle, and to display the received at least one determined parameter value in dependence of the momentary determined position of the vehicle to a user, and
    wherein the external communication device is further arranged for receiving barn map information input from the user on the basis of the displayed position and/or parameter values, and is further arranged to send the inputted barn map information to the control unit.

2. The animal farm system of claim 1, wherein the barn map information comprises at least one of a position, dimension, orientation or designation of one of said animal related structures.

3. The animal farm system of claim 1, wherein the control unit is arranged to use the inputted barn map information for controlling to move the vehicle or to calibrate or verify a position as determined by the position determining system.

4. The animal farm system according to claim 1, wherein the motion control information and/or navigation information comprises instructions for moving the vehicle in a desired direction.

5. The animal farm system of claim 1, wherein the control unit is arranged to control the vehicle based on the motion control information and/or navigation information, and wherein the motion control information and/or navigation information comprises a number of vehicle control actions based on the inputted barn map information, the inputted barn map information including driving along a wall defined based on the inputted barn map information while the vehicle abuts against said wall, and/or driving along a straight line from a start point to an end point defined on a barn map created based on the inputted barn map information, and/or making a turn defined on a barn map created based on the inputted barn map information, and/or driving along a wall defined based on the inputted barn map information while the vehicle remains at a predetermined distance from said wall, and/or driving to the reference position defined on a barn map created based on the inputted barn map information.

6. The animal farm system of claim 1, wherein the parameter related to a position of the vehicle with respect to the barn or an object therein is or comprises a distance to an obstacle, the obstacle including one or more of said animal related structures and/or one or more of said walls.

7. The animal farm system of claim 1, wherein the sensor system comprises a distance sensor, a laser distance sensor and/or a 3D-camera system.

8. The animal farm system of claim 7, wherein the sensor system comprises at least two distance sensors, wherein, in the case that one of the sensors measures a second distance that the control unit maps on a structure in the map, the control unit is arranged to control the vehicle and/or to correct the position as determined by the position determining system on the basis of the second distance.

9. The animal farm system of claim 1, wherein the vehicle comprises wheels and a drive motor for driving at least one of the wheels, and
    wherein the position determining system comprises a system for measuring travelled distance based on wheel revolutions and/or a system for measuring the amount of energy delivered to the drive motor and/or a gyroscope for determining a direction of travel.

10. The animal farm system of claim 1, wherein the position determining system comprises the sensor system.

11. The animal farm system of claim 1, wherein the external communication device comprises a computer with a display, and
    wherein the computer is arranged to visualize on the display said positions as a set of vehicle position indications with respect to a reference position and as determined by the position determining system, and also said parameter values as a set of object position indications on the basis of the parameter value determined by the sensor system and in each case with respect to a momentary vehicle position at which the parameter value was determined.

12. The animal farm system of claim 11, wherein the external communication device is arranged to receive a user input that couples one or more of said object position indications to one or more of said animal related structures and/or one or more of said walls.

13. The animal farm system of claim 11, wherein the external communication device is arranged to receive correction information for one or more of said object position indications from the user and send said information to the vehicle communication device, and wherein the control unit is arranged to store said information in a memory as corrected navigation information.

14. The animal farm system of claim 1, wherein the barn comprises an electrical charging device for charging electrical energy in the vehicle, and
wherein the reference position is a position of the charging device.

15. The animal farm system according to claim 1, wherein the autonomous vehicle is a feed pusher, a feeding vehicle, a manure removal device or a milking vehicle, wherein the animal related action is one or more of delivering animal feed to animals in a barn, pushing material over a floor of a barn, pushing manure over a slatted floor of a barn, sucking and/or scooping manure from a floor of a barn, or milking an animal.

16. A method of generating barn map information of the animal farm system according to claim 1, the method comprising:
generating an empty map on the external communication device;
designating a reference position for the vehicle;
controlling the vehicle to move in the barn;
while the vehicle moves, having the vehicle positioning system repeatedly determine a position of the vehicle and having the sensor system determine a parameter value at said position;
sending the determined positions and parameter value to the external communication device;
visualizing the parameter values in dependence of the determined positions;
inputting into the external communication device, barn map information based on the visualized parameter values; and
receiving by the control unit, said inputted barn map information.

17. The method according to claim 16, wherein the step of determining the position of the vehicle comprises, in case the memory comprises already some barn map information with position information of at least one animal related structure, matching one or more of the parameter values on the basis of the stored barn map information and the determined position of the vehicle.

18. The method according to claim 16, wherein the sensor system comprises a first sensor and a second sensor, each of the first and second sensors being arranged to determine a parameter value, the method further comprising;
determining with the first sensor a first parameter value corresponding to stored map information;
correcting the determined vehicle position on the basis of the determined first parameter value;
determining a second parameter value with the second sensor; and
determining a new obstacle position based on the corrected vehicle position and the second parameter value.

19. The animal farm system of claim 1, wherein the at least one animal related structure positioned within the barn is a feeding alley or feeding system, a drinking system, a cubicle, and/or a milking system.

20. The animal farm system according to claim 1, wherein the control unit is arranged to use the inputted barn map information for controlling to move the vehicle or to calibrate or verify a position as determined by the position determining system before all the barn map information is obtained.

21. The animal farm system of claim 1, wherein the position determining system is an odometry or GPS system and the sensor system is a distance sensor.

* * * * *